Figure 1:
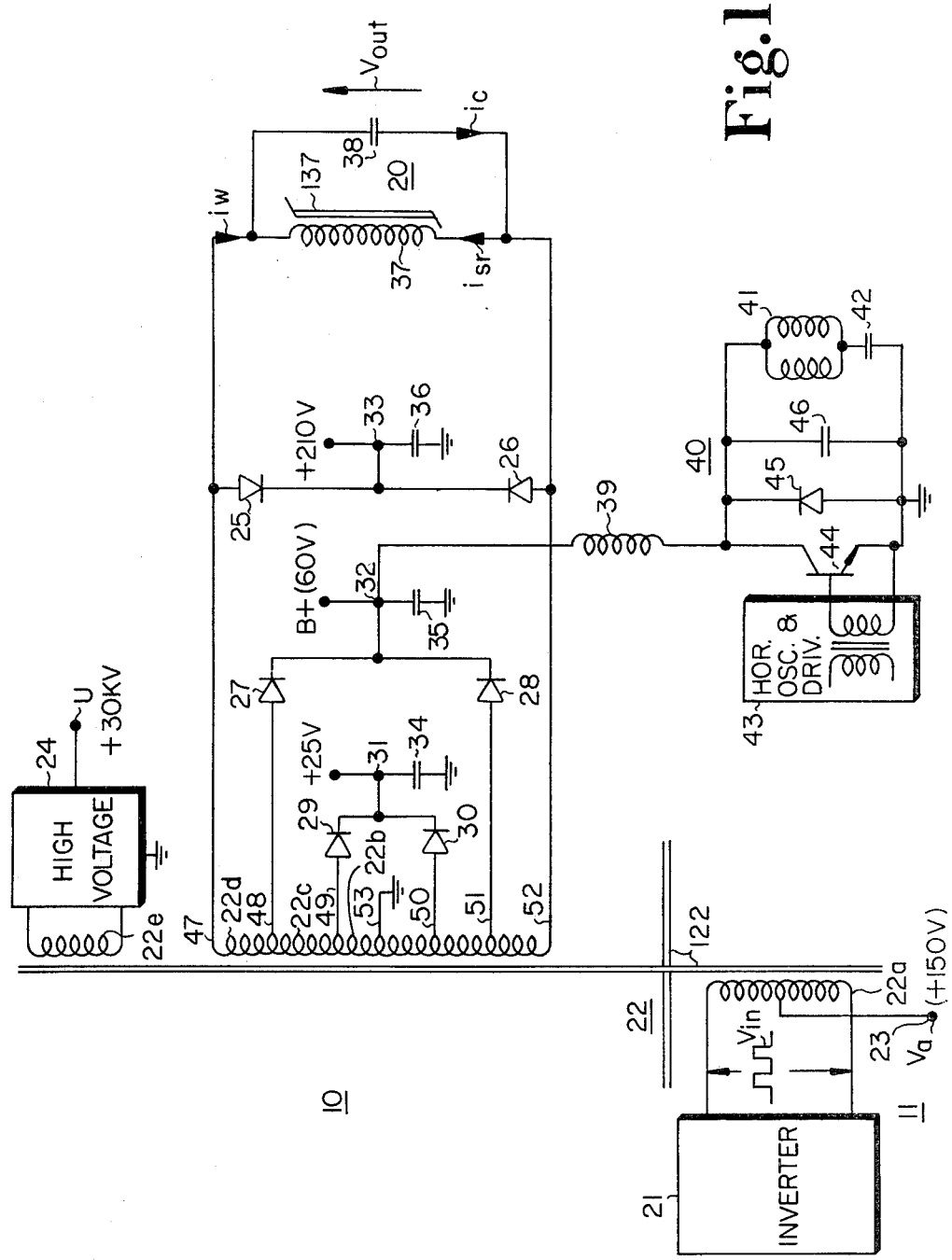

United States Patent [19]

Willis

[11] 4,446,405
[45] May 1, 1984

[54] TELEVISION RECEIVER FERRORESONANT LOAD POWER SUPPLY

[75] Inventor: Donald H. Willis, Indianapolis, Ind.
[73] Assignee: RCA Corporation, New York, N.Y.
[21] Appl. No.: 383,056
[22] Filed: May 28, 1982

Related U.S. Application Data

[63] Continuation of Ser. No. 220,847, Dec. 29, 1980, abandoned.

[51] Int. Cl.$^3$ .............................................. H01J 29/70
[52] U.S. Cl. ................................. 315/411; 323/310; 363/75; 315/400
[58] Field of Search ................. 315/411, 400; 358/190; 323/306, 307, 310; 363/75

[56] References Cited

U.S. PATENT DOCUMENTS

| | | | |
|---|---|---|---|
| 1,985,634 | 12/1934 | Fleming | 171/119 |
| 2,706,271 | 4/1955 | Fletcher | 323/48 |
| 2,811,689 | 10/1957 | Balint | 323/48 |
| 2,973,470 | 2/1961 | Kohn | 323/60 |
| 2,999,973 | 9/1961 | Medlar | 323/60 |
| 3,219,881 | 11/1965 | Rudaz | 315/278 |
| 3,247,449 | 4/1966 | Medlar | 323/60 |
| 3,247,450 | 4/1966 | Medlar | 323/60 |
| 3,341,766 | 9/1967 | Rhyne, Jr. | 321/9 |
| 3,398,292 | 8/1968 | Kuba | 307/51 |
| 3,739,255 | 6/1973 | Leppert | 321/16 |
| 3,868,538 | 2/1975 | Blanchard | 315/411 |
| 3,988,662 | 10/1976 | Hunter | 323/48 |
| 4,019,122 | 4/1977 | Ryan | 323/60 |
| 4,075,547 | 2/1978 | Wroblewski | 323/60 |
| 4,262,245 | 4/1981 | Wendt | 323/308 |

FOREIGN PATENT DOCUMENTS

| | | |
|---|---|---|
| 3003321 | 7/1980 | Fed. Rep. of Germany . |
| 1096622 | 12/1967 | United Kingdom . |
| 1254077 | 11/1971 | United Kingdom . |
| 2041668 | 9/1980 | United Kingdom . |

OTHER PUBLICATIONS

B. N. Ivanchuk and B. I. Azvinov, "Parametric Voltage Regulators Using Semiconductor Devices and Magnetic Amplifiers", Energy Publishers, Moscow, 1971, p. 75.

D. I. Bogdanov, "Ferroresonant Voltage Regulators", Energy Publishers, Moscow, 1972, p. 8.

*Primary Examiner*—Theodore M. Blum
*Attorney, Agent, or Firm*—E. M. Whitacre; P. J. Rasmussen; J. J. Laks

[57] ABSTRACT

To regulate a supply voltage for a television receiver load circuit, such as the ultor voltage for a high voltage circuit, the primary winding of a transformer is coupled to a source of alternating input voltage for developing an alternating polarity voltage across a secondary winding of the transformer. A saturable reactor includes a magnetizable core with a reactor winding wound around the core. The reactor winding and the transformer secondary winding are conductively coupled to develop an alternating polarity voltage across the reactor winding. The transformer secondary winding is magnetically isolated from the saturable reactor such that the magnetic flux flowing in the reactor core does not link the transformer secondary winding. A capacitor is coupled to the saturable reactor winding for developing a circulating current that aids in magnetically saturating a portion of the reactor core associated with the reactor winding. The voltages across the conductively coupled transformer secondary winding are thereby regulated. The high voltage load circuit is coupled to a third winding of the transformer and is energized by the regulated alternating polarity supply voltage appearing across the third winding.

12 Claims, 3 Drawing Figures

TELEVISION RECEIVER FERRORESONANT LOAD POWER SUPPLY

This is a continuation of application Ser. No. 220,847 filed Dec. 29, 1980; now abandoned.

This invention relates to ferroresonant television power supplies.

Ferroresonant transformers are known which provide reguled ultor voltages and regulated B+ scanning voltages for television receivers. Such a television receiver ferroresonant power supply is described in a U.S. patent application of F. S. Wendt, Ser. No. 144,150, filed Apr. 28, 1980, entitled "HIGH FREQUENCY FERRORESONANT POWER SUPPLY FOR A DEFLECTION AND HIGH VOLTAGE CIRCUIT", Now U.S. Pat. No. 4,319,167. When operated at relatively high input frequencies, such as at the horizontal deflecion frequency of 15.75 KHz, a ferroresonant transformer is a relatively compact and low weight unit which provides inherent output voltage regulation without the necessity of relatively complex and expensive electronic regulator control circuitry.

To provide reasonably good efficiencies at the high operating frequencies of a 16 KHz ferroresonant transformer, the magnetizable core of the transformer may be formed from a ferrite such as a manganese-zinc or nickel-zinc ferrite, commercially available. Such ferrite materials exhibit a high resistance to current, thereby incurring relatively small eddy current losses which otherwise would be excessive at the relatively high 16 KHz operating frequency. Hysteresis losses are also relatively low. Even when using a ferrite core, eddy current losses, hysteresis losses and $I^2R$ losses generated in the winding that is coupled to the circulating current producing capacitor of the ferroresonant transformer and transferred to the core may produce a substantial rise in the core temperature over the ambient temperature.

The saturation flux density, Bsat, of a magnetizable material decreases with increasing core temperauture. For manganese-zinc ferrites, saturation flux density may decrease from about 4.5 kilogauss at 20° C. to 2.5 kilogauss at 150° C. Since the output voltages of a ferroresonant transformer depend on the Bsat value of the core material under the output windings, a rise in core operating temperature results in an undesirable decrease in the output voltages, such as a decrease in the ultor high voltage. Thus, for example, the ultor voltage developed immediately after the television receiver is turned on, while the ferroresonant transformer core is at ambient temperature, is greater than the ultor voltage developed during subsequent steady-state temperature operation after the core has heated up to its normal above-ambient operating temperature.

Heat sinking of the core to reduce temperature rise from start-up to steady-state temperature operation is a relatively difficult procedure in a high frequency television receiver ferroresonant transformer that provides regulated output voltages including a regulated ultor high voltage. The output windings of the ferroresonant transformer, including the high voltage winding which has a relatively large number of turns, are wound around the saturating core portion of the transformer and tightly coupled magnetically one to another. The multiple output windings and the large number of high voltage winding turns restrict acces to the core for heat sinking purposes.

A feature of the invention is to design a television reciver power supply with a saturable reactor regulator portion and a separate power transformer. The reactor winding is conductively coupled to a transformer secondary winding to regulate the secondary winding voltage.

The transformer includes a first winding coupled to a source of alternating input voltage to develop an alternating polarity voltage across the secondary winding. The saturable reactor includes a magnetizable core and the reactor winding wound on the core. The reactor winding and the transformer secondary winding are conductively coupled for developing an alternating polarity voltage across the reactor winding. The transformer secondary winding is magnetically isolated from the saturable reactor such that the magnetic flux flowing in the reactor core does not link the transformer secondary winding. A capacitance is coupled to a winding of the saturable reactor for developing a circulating current that aids in magnetically saturating a portion of the reactor core associated with the reactor winding that is conductively coupled to the transformer secondary winding. The capacitance coupled winding may in fact comprise the conductively coupled reactor winding.

By magnetically saturating the reactor core, the voltages across the conductively coupled saturable reactor winding and transformer secondary winding are regulated. A third winding of the transformer, such as the high voltage winding, is responsive to the regulated voltage developed across the transformer secondary winding for developing across the third winding a regulated alternating polarity output voltage A load circuit such as the ultor circuit is coupled to the transformer third winding and is energized by the regulated output voltage.

An advantage of the above-recited arrangement is that the saturating core element which provides the voltage regulation is not a part of the transformer core around which are wound the output secondary windings which provide the television receiver regulated supply voltages. Thus, the high voltage winding is wound around the transformer core rather than around the saturable reactor core, providing easier access to the saturating core portion for heat sinking purposes.

Furhtermore, the transformer core under which the secondary output windings are wound may be operated substantially in the unsaturated region of the B-H loop characteristic of the transformer core material. The output voltages across the transformer secondary windings arer nonetheless regulated because the windings can be tightly coupled magnetically with the regulated output winding that is conductively coupled to the saturable reactor winding.

Figure 2:
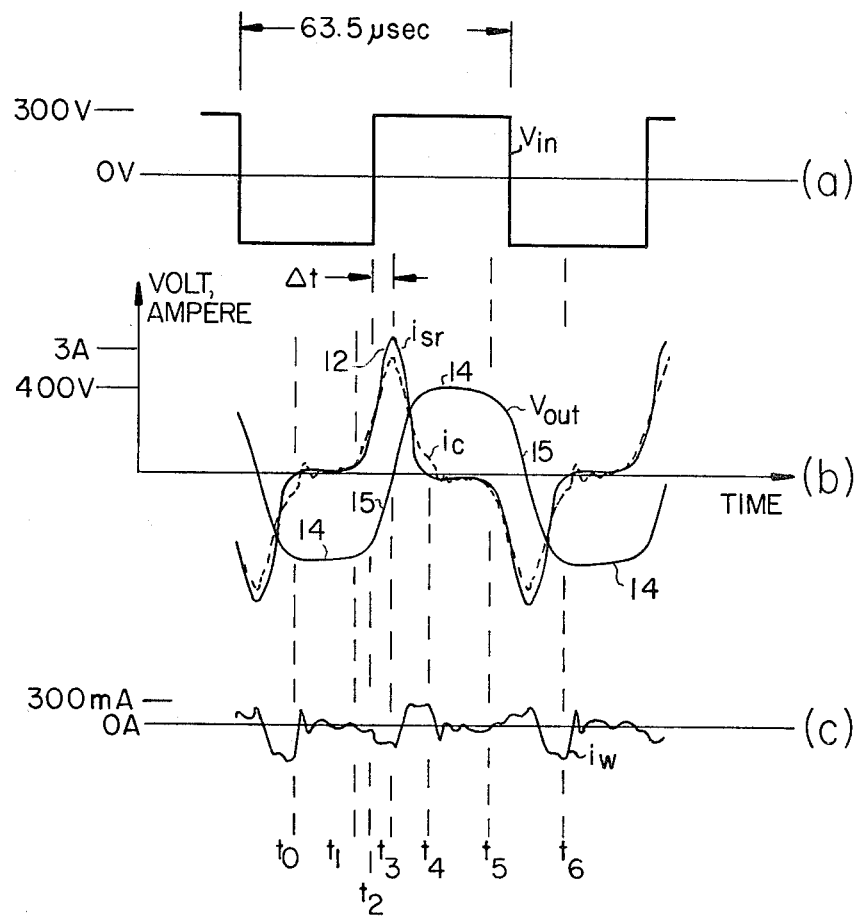
Figure 3:
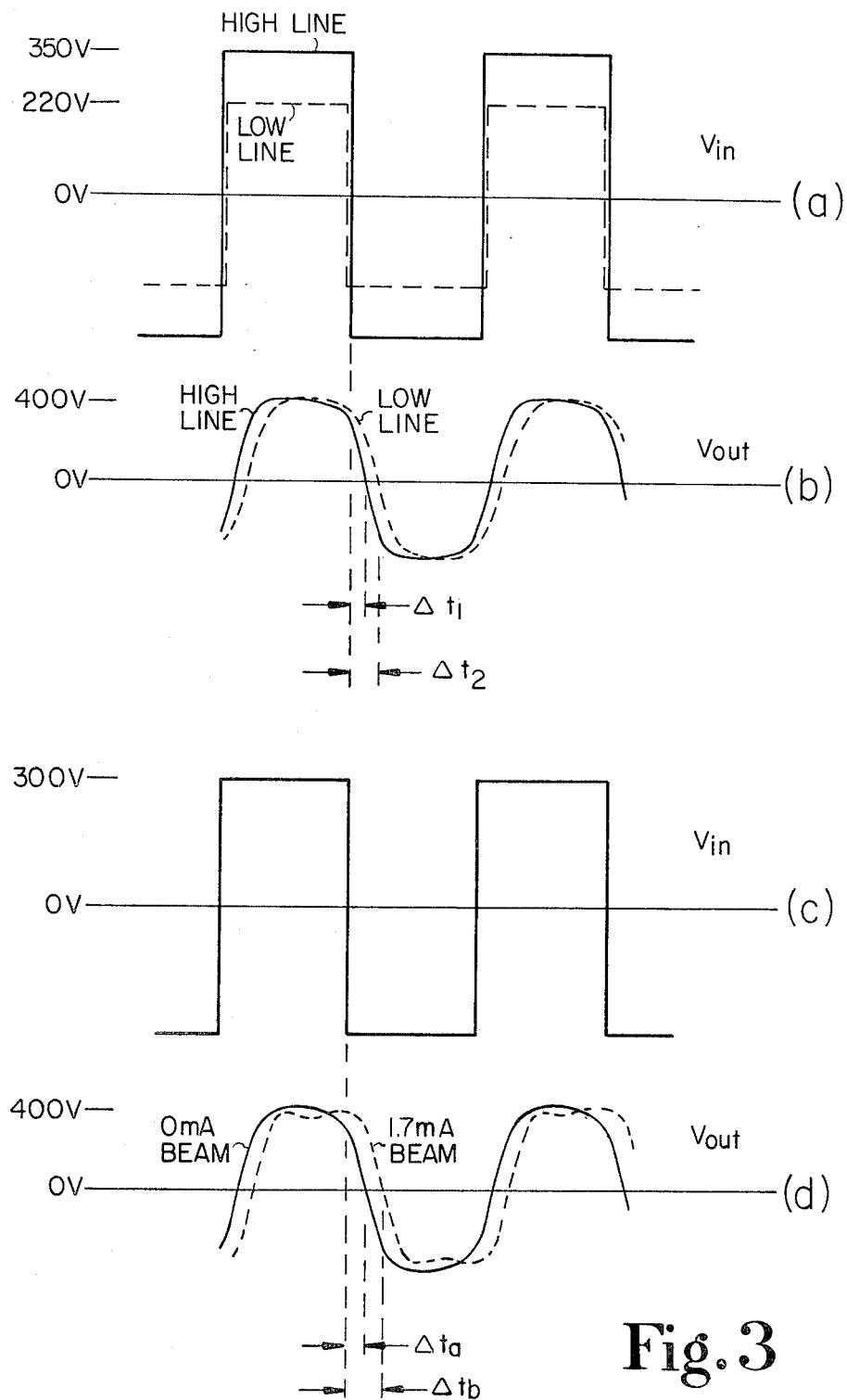

FIG. 1 illustrates a ferroresonant televison low and high voltage power supply embodying the invention; and FIGS. 2 and 3 illustrate waveforms associated with the operation of the circuit of FIG. 1.

In FIG. 1, a ferroresonant television low and high voltage power supply 10 comprises a transformer 22 and a ferroresonant saturable reactor load circuit 20. A primary winding 22a of transformer 22 is coupled to a source 11 of unregulated alternating input voltage Vin comprising an inverter 21 and a DC input terminal 23 coupled to a center tap of primary winding 22a. An unregulated DC voltage $V_a$ is applied to termainal 23. Inverter 21 is operated at a high frequecy of, for example, the 15.75 KHz horizontal deflection frequency. Inverter 21 develops the alternating input voltage Vin as a horizontal rate square-wave voltage across primary winding 22a.

When the voltage Vin is applied to primary winding 22a, horizontal rate alternating polarity output voltages are developed across secondary output windings 22b–22d and a high voltage secondary winding 22e. End leads 49 and 50 of output winding 22b are connected, respectively, to full-wave rectifying diodes 29 and 30; end leads 48 and 51 of output winding 22c are coupled, respectively, to full-wave rectifying diodes 27 and 28; and end leads 47 and 52 of output winding 22d are coupled, respectively, to full-wave rectifying diodes 25 and 26. A common center tap lead 53 is coupled to ground.

The alternating polarity output voltage developed across winding 22b is full-wave rectified by diodes 29 and 30 and filtered by a capacitor 34 to develop a DC supply voltage at a terminal 31, of illustratively +25 volts, to energize such television receiver circuits as the vertical deflection circuit and the audio circuit. The alternating polarity output voltage developed across winding 22d is full-wave rectified by diodes 25 and 26 and filtered by a capacitor 36 to develop a DC supply voltage at a terminal 33, of illustratively +210 volts, to power such circuits as the television receiver picture tube driver circuits.

The alternating polarity output voltage developed across winding 22c is full-wave rectified by diodes 27 and 28 and filtered by a capacitor 35 to develop at a terminal 32 a B+ scan supply voltage for a horizontal deflection winding 41. To generate horizontal scanning or deflection current in horizontal deflection winding 41, a horizontal deflection generator 40 is coupled to terminal 32 through an input choke 39. Horizontal deflection generator 40 is energized by the B+ scan supply voltage and comprises a horizontal oscillator and driver 43, a horizontal output transistor 44, a damper diode 45, a horizontal retrace capacitor 46 and an S-shaping or trace capacitor 42 coupled in series with horizontal deflection winding 41 across horizontal output transistor 44.

The alternating polarity output voltage developed across high voltge output winding 22e is coupled to a high voltage circuit 24 to develop a DC ultor high voltage or accelerating potential at a terminal U for the television receiver picture tube, not illustrated. High voltage circuit 24 may comprise a conventional voltage multiplier circuit of the Cockroft-Walton type, or may comprise a half-wave rectifier arrangement with a plurality of diodes integrally molded as a single unit with a plurality of winding sections, not individually illustrated, of high voltage winding 22e.

Secondary output windings 22b–22d and high voltage secondary winding 22e are closely or tightly coupled magnetically one to another. To achieve the tight coupling, the windings may be wound concetrically around a common portion of the magnetizable core 122 of transformer 22. Because of the tight magnetic coupling among the windings, the alternating polarity output voltages developed across the secondary output windings are all of common waveshape, with little departure being introduced by the relatively small leakage inductances existing between any two of the output windings.

To regulate the secondary output winding voltages against avariations in the amplitude of the input voltage Vin and against loading changes by the load circuits coupled to terminals 31-33 and beam current loading changes on ultor terminal U, the ferroresonant saturable reactor circuit 20 is coupled as a load circuit across one of the tightly or closely coupled secondary output windings of transformer 22. In FIG. 1, the saturable rector circuit 20 is illustratively coupled across secondary output winding 22d.

Ferroresonant saturable reactor load circuit 20 comprises a reactor coil or winding 37 wound around at least a portion of a saturating, magnetizable core 137 and comprises a resonating capacitor 38 coupled across reactor wingin 37. Saturable reactor core 137 may be of a conventional toroidal or two-window rectangular core design.

In a ferroresonant circuit such as the ferroresonant saturable reactor circuit 20 of FIG. 1, the voltage Vout across the saturating coil 37 is regulated. By coupling ferroresonant saturable reactor circuit 20 across the secondary output winding 22d of transformer 22, circuit 20 acts as a regulating load circuit coupled to winding 22d to maintain the voltage across winding 22d as the regulated voltage Vout. With the voltage across secondary winding 22d regulated by the ferroresonant circuit 20, the output voltages across all the other secondary windings tightly coupled with winding 22d are also regulated. Thus, the output voltages across windings 22b and 22c and high voltage output winding 22e are regulated by the regulating action on the voltage Vout of ferroresonant circuit 20.

Transformer 22 is designed to incorporate substantial primary and secondary leakage inductance between primary winding 22a and each of the tightly coupled regulated secondary windings 22a–22e. The loose coupling of the primary winding with the secondary output windings enables the output voltage to be maintained substantially constant by ferroresonant circuit 20 even though the applied voltage across primary winding 22a changes with variations in the alternating input voltage Vin. Leakage inductance between primary winding 22a and each of the secondary windings 22b–22e may be designed into transformer 22 by constructing the magnetizable core 122 of the transformer as a closed loop core of rectangular shape. Primary winding 22 may be wound on one leg of core 122 and the output windings 22b–22e may be concentrically wound on an opposing leg.

When considering the equivalent electrical circuit of transformer 22, the load circuits coupled to terminals 31–33 and to ultor terminal U are reflected to the primary side as load impedances in parallel with the reflection of the ferroresonant load circuit 20. Because of the loose magnetic coupling between the primary winding 22a and the output secondary windings, the reflected ferroresonant load circuit and the other parallel loads see an equivalent impedance in series with the source 11 of alternating input voltage Vin. This equivalent impedance produced by the loose magnetic coupling of transformer 22 absorbs the variations in input voltage while enabling the ferroresonant load circuit and output winding voltage amplitude variations to be substantially reduced when compared to the primary winding voltage amplitude variations.

FIG. 2a illustrates the square-wave alternating polarity input voltage Vin developed by source 11 across the end leads of the primary winding 22a of transformer 22. Illustrated in FIG. 2b is the regulated voltage Vout developed across ferroresonant saturable reactor circuit 20 and secondary output winding 22d of transformer 22.

The regulated voltage Vout is an alternating polarity voltage of the same frequency as the input voltage Vin with generally flattened portions 14 alternating in polarity and connected by generally sinusoidal-like portions 15.

Within the flattened portion intervals of the regulated output voltage Vout, such as between times $t_0$–$t_1$ of FIG. 2b, the satuable reactor magnetizable core portion associated with coil 37 is being operated in the magnetically unsaturated region of the core material B-H loop characteristic. Saturable reactor coil or winding 37 exhibits a relatively large inductance during the flattened portion or unsaturated intervals. Relatively little current $i_{sr}$ flows in the saturable reactor winding 37 as illustrated in the solid-line waveform $i_{sr}$ of FIG. 2b between times $t_0$–$t_1$.

With saturable reactor winding 37 exhibiting a relatively high impedance during the flattened portions or magnetically unsaturated intervals of the output voltages waveform Vout, the resonating capacitor 38 is discharged very little into the saturable reactor coil, and the capacitor maintains a relatively constant output voltage Vout applied across the coil terminals, as illustrated by the relatively small capacitor current $i_c$, the dashed-line waveform of FIG. 2b, between times $t_0$–$t_1$.

The output voltage Vout when applied by capacitor 38 across reactor winding 37 produces a flux buildup in the reactor core 137 until substantial magnetic saturation of the core occurs near time $t_1$. When reactor core 137 magnetically saturates near time $t_1$, the inductance of reactor coil 37 decreases substantially. The inductance of coil 37 may be, illustratively, 20 to 60 times less than the unsaturated inductance of the coil.

After reactor core 137 becomes magnetically saturated, capacitor 38 and reactor coil 37 undergo a half cycle of resonant current oscillation, as indicated in FIG. 2b by the current pulse 12 of the coil current $i_{sr}$ and as indicated by the current pulse in the capacitor current $i_c$ between times $t_1$–$t_4$. The resonant or circulating current in saturable reactor coil 37 and in capacitor 38 reaches maximum magnitude at time $t_3$. The output voltage Vout reverses polarity, also at this time.

Near time $t_4$, resonant current pulse 12 has decreased sufficiently to enable reactor core 137 to come out of saturation, enabling the reactor coil 37 to reexhibit a high impedance. The voltage across capacitor 38, that is, the regulated output voltage Vout, stops changing rapidly and assumes the opposite polarity flattened portion values. During the opposite polarity flattened portion interval $t_4$–$t_5$, the reactor core 137 is again operated in the magnetically unsaturated region of its B-H loop characteristic. The flux in core 137 reverses direction during this interval and builds up, substantially, to its saturation flux magnitude near time $t_5$ when the core again magnetically saturates. The current in the reactor winding 37 then undergoes another half cycle of oscillation between times $t_5$–$t_6$.

Ferroresonant saturable reactor circuit 20 functions as a magnetic voltage regulator to maintain a relatively constant amplitude output voltage Vout under varying input voltage conditions and under varying loading conditions on the various secondary output windings such as under varying beam current loading of ultor terminal U. With a sufficient large capacitance value for capacitor 38, the AC component of the flattened portions of the output voltage Vout is relatively small. The area under a flattened portion of the voltage waveform Vout equals the time integration of the output voltage Vout over the flattened portion interval, or equivalently represents the maximum change in flux linkage of reactor coil 37.

The maximum flux linkage of coil 37 is proportional to the saturation flux density Bsat of the magnetizable material of reactor core 137. Since the maximum flux linkage of reactor coil 37 is substantially a constant amount independent of input voltage variations, the area under the flattened portion of the output voltage Vout is also a constant independent of input voltage variations. Thus, the amplitude of the output voltage Vout will be requlated and of substantially unchanged value provided that the duration of the flattened portion of output voltage Vout during which the reactor core 137 is unsaturated remains relatively fixed.

The period of the alternating polarity output voltage Vout is that of the input voltage Vin and is of a fixed duration. Also the duration, within this period, of the magnetically saturated intervals $t_1$–$t_4$ and $t_5$–$t_6$ is fixed by the value of the inductance of coil 37 near or at saturation and by the value of the capacitance of capacitor 38. The duration of the unsaturated portions of the output voltage Vout is therefore also fixed, thereby enabling the output voltage to assume a relatively constant amplitude.

With the secondary output winding 22d of transformer 22 coupled across the ferroresonant saturable reactor lad circuit 20, the voltage across output winding 22d is constrained to assume the regulated output voltage Vout even though the input voltage Vin may vary in amplitude. Similarly constrained to assume regulated voltages are all the other secondary output windings 22b, 22c and high voltage winding 22e. Varying the input voltage and loading of the output windings varies the shift in phase of the alternating output voltage Vout relative to the phase of the alternating input voltage Vin while maintaining the amplitude of the output voltage Vout relatively unchanged. As illustrated in FIGS. 2a and 2b, at an operating condition of nominal input voltage and of average loading on output windings 22b–22e, e.g., at approximately ½ milliampere beam current loading, the output voltage Vout is phase delayed by an amount $\Delta t$ relative to the phase of the input voltage. The phase delay $\Delta t$ occurs because of the power dissipation in the load circuits coupled to secondary output windings 22b–22e. The phase delay between Vin and Vout enables power to be transferred from source 11 to the secondary output winding load during each cycle of the input or output voltage oscillation.

As illustrated in FIGS. 3a and 3b, when the input voltage Vin varies from a high-line input voltage level to a low-line input voltage level, the phase delay of the output voltage Vout increases from a delay of $\Delta t_1$ to a delay of $\Delta t_2$. The increase in phase delay at the lower input voltage level occurs because a greater phase delay is required at the lower input voltage level to transfer the same average power to the secondary winding loads. Although the phase delay of the output voltage Vout has increased at the lower input voltage level, the amplitude of Vout and the half cycle average voltage has not significantly changed, thereby providing the required regulation against input voltage variations.

As illustrated in FIGS. 3c and 3d, when beam current loading of ultor terminal U increases from zero milliampere draw to 1.7 milliamper draw, the phase delay of the output voltage Vout increases from a phase delay of $\Delta t_a$ to a delay of $\Delta t_b$, at, for example, the same, nominal input voltage level. The increases in phase delay occurs because a greater phase delay is required to transfer more average power at the greater secondary winding loading condition. Although the phase delay of the output voltage Vout has increased, the amplitude of Vout in FIG. 3d and the half cycle average voltage has not significantly changed, thereby providing the required regulation against loading variations.

A feature of the invention is to provide regulated output voltages across transformer secondary windings without requiring the core portion of the transformer associated with the secondary windings to magnetically saturate. Thus, the power transformer that is coupled to the AC voltage source, such as transformer 22 of FIG. 1, does not have the design constraints imposed upon it that a ferroresonant transformer has. In contrast to a similar ferroresonant transformer situation, the portion of the transformer magnetizable core 122 associated with or under the transformer secondary output windings 22b–22d may be operated in the linear region of the core material B-H loop characteristic. The core remains substantially unsaturated magnetically during the entire alternating polarity output voltage cycle.

Several advantages accrue by using the inventive arrangement of FIG. 1 wherein a power transformer provides regulated output voltages across secondary output windings but the core of the transformer, nonetheless, is operated in the linear region of its B-H loop characteristic and wherein the regulation is achieved by a separate ferroresonant saturable reactor circuit coupled as a regulating load across one of the power transformer output windings. For example, in a ferroresonant transformer arrangement, unlike in the arrangement of FIG. 1, a relatively high circulating or resonant current flows in one of the ferroresonant transformer output windings. To reduce I²R losses in that winding, a relatively thick or large cross-section conductor wire is used. Since it is generally good practice to keep all the secondary output windings tightly coupled to one another, use of a thick conductor wire is contrary to such good practice.

In contrast, no large circulating or resonant current flows in any of the output secondary windings of power transformer 22 of FIG. 1. As illustrated in FIG. 2c, for example, the current $i_w$ flowing out of output winding 22d to ferroresonant load circuit 20 is of relatively small amplitude with a peak magnitude, illustratively, 10 or more times smaller than the peak magnitude of the resonant current pulse 12 flowing in reactor coil 37. Only enough current $i_w$ on average need flow out of transformer 22d to replenish the losses incurred during each cycle of the alternating polarity regulated output voltage Vout. Losses include hysteresis and eddy current heating of the reactor magnetizable core 137, I²R losses in the reactor coil 37. Losses also include energy losses sustained by capacitor 38 during each cycle of the output voltage Vout that occur due to load current flowing out of terminal 33 and due to load current flowing to the load circuits coupled to terminals 31 and 32 and ultor terminal U as reflected into output winding 22d.

Another advantage of the arrangement of FIG. 1 is the greater design flexibility provided in selecting the parameters of the ferroresonant portion 20 of the power supply system 10 without requiring a redesign of the power transformer portion 22 of the system. Because secondary output winding 22d of transformer 10 is magnetically isolated from saturable reactor coil 37 and magnetizable core 137, that is, because the magnetic flux flowing in reactor core 137 does not link the transformer output winding 22d, design changes in the magnetizable core 137 and in the values of the resonant or circulating current provided by capacitor 38 do not require any substantial design changes to transformer 10, provided the changes in ferroresonant circuit 20 do not significantly degrade the regulation of output voltage Vout.

The amplitude of the output voltage Vout produced by ferroresonant load circuit 20 is proportional to the saturation flux density Bsat characteristic of the magnetizable material of reactor core 137. To reduce eddy current losses in core 137 when operating at relatively high source frequencies of 16 KHz or more, a core material with a relatively high resistance to eddy current flow is selected. Commercially available core materials that may be used for saturable reactor core 137 are, for example, manganese-zinc ferrites, nickel-zinc ferrites, or lithium ferrites. Manufacturing process tolerance in the production of the ferrite core material may result in relatively large tolerances to the value of the material Bsat.

To take into account the Bsat tolerance from core unit to core unit, the number of conductor turns of reactor coil 37 wound around core 137 may be varied for each core unit in order to maintain the output voltage Vout unchanged from unit to unit. Since regulated output voltages for most of the television receiver circuits are obtained across output windings from a separate transformer, the tolerances in Bsat of core 137 and the variations in conductor turn number for coil 37 to compensate therefor do not require corresponding changes in the number of turns or other parameters of transformer 22.

The value of Bsat of the magnetizable material of reactor core 137 is a function of the operating temperature of the core, with the value of Bsat decreasing as the operating temperature increases. Core 137 heats up after initial television receiver turn-on because of hysteresis and eddy current losses sustained during operation and because of the heating up, due to I²R losses, of the conductor wire of coil 37 wound around reactor core 137. Prior to energization of power supply 10, the temperature of saturable reactor core 137 is the ambient temperature. After energization of the power supply, the core 137 heats up to some steady-state temperature value above ambient. During the time interval when the core is heating up, the Bsat of the core decreases with the rising core temperature. Thus, the output voltage Vout of the ferroresonant regulating load circuit 20 decreases from its initial higher value at turn-on of the television receiver to a lower steady-state value when the final operating temperature of core 137 is reached.

To minimize the temperature change from start-up to steady-state temperature operation, the saturable reactor coil 37 and core 137 may be heat sinked in a conventional manner to a cooling plate or the television receiver metal chassis. Heat sinking of the saturable reactor core 137 of the inventive arrangement of FIG. 1, where only one or a small number of coils are wound around the reactor core 137, is a relatively less difficult procedure than heat sinking of the saturating core portion of a ferroresonant transformer which provides multiple output voltages across multiple output windings wound around the saturating core portion of the ferroresonant transformer. Furthermore, it is even more difficult to heat sink a ferroresonant transformer having a high voltage winding because the large number of turns wound around the saturating core portion of the transformer blocks easy access to the core portion.

In FIG. 1, heat sinking of the core 122 of power transformer 22 is not required since the power transformer core material is operated in the linear region of its B-H loop characteristic and thus incurs relatively little core loss and little operating temperature rise. Furthermore, no circulating or resonant current flows in any of the output windings of transformer 22. $I^2R$ losses in the transformer output windings and heating up of the transformer core 122 therefrom are relatively insignificant.

As an illustrative embodiment of power transformer 22, the primary winding inductance, $L_p$, as measured from the center tap terminal to an end terminal, is 2.03 millihenry; the secondary inductance $L_S$ of secondary winding 22d is 10.3 millihenry; and the mutual inductance, M, between the above two described windings is 3.35 millihenry. The core material may be a manganese-zinc ferrite and the transformer core geometry may be of any suitable arrangement that will provide the above inductance values while maintaining the core magnetically unsaturated.

As an illustrative embodiment of ferroresonant load saturable reactor 20, the capacitance of capacitor 38 may be 0.033 microfarad; the core material saturation flux density, cross-sectional area and number of turns may then be selected so as to produce a Vout waveform similar to that of FIG. 2b, during the unsaturated intervals $t_0-t_1$ and $t_4-t_5$, with the unsaturated inductance of coil 37 being relatively large, on the order of one henry. The number of turns, the core geometry, such as mean magnetic path length and cross-sectional area, and the core material B-H characteristic are such that when substantial magnetic saturation occurs, near times $t_1$ and $t_5$ of FIG. 2a, the inductance of coil 37 decreases substantially to around 500 microhenry or even less at peak currents. A suitable core material may be a ferrite such as a lithium-bizmuth ferrite which has the added advantage of a relatively small change in Bsat with core operating temperature change when compared to many other ferrites. The core may be constructed as a toroid or as a double E-core.

What is claimed is:

1. A television system with a ferroresonant load regulated high voltage power supply, comprising:
    a source of unregulated alternating input voltage;
    a transformer having primary, secondary and high voltage windings, said primary winding being coupled to said source for developing alternating polarity voltages across said secondary and high voltage windings that tend to undesirably vary with variations of said unregulated voltage;
    a high voltage circuit coupled to said high voltage winding for developing an ultor voltage from the high voltage winding alternating polarity voltage; and
    a ferroresonant saturable reactor core and a load coil wound on said core and conductively coupled to and magnetically isolated from said transformer secondary winding, said ferroresonant saturable reactor load coil being responsive to and providing regulation of the transformer secondary winding alternating polarity voltage for developing a regulated alternating polarity voltage across said high voltage winding.

2. A television system according to claim 1 wherein said high voltage winding is closely coupled magnetically with said transformer secondary winding and including a fourth transformer winding closely coupled magnetically with said transformer secondary winding and a deflection generator energized by the voltage developed across said transformer fourth winding for generating deflection current.

3. A television system with a ferroresonant load regulated deflection generator power supply, comprising:
    a source of unregulated alternating input voltage;
    a deflection generator including a deflection winding;
    a transformer having primary and secondary windings, said primary winding being coupled to said source for developing an alternating polarity voltage across said secondary winding that tends to undesirably vary with variations of said unregulated voltage;
    means responsive to said secondary winding alternating polarity voltage for developing a B+ scan supply voltage therefrom;
    means for applying said B+ scan supply voltage to said deflection generator to develop scanning current in said deflection winding; and
    a ferroresonant saturable core and load coil wound thereon and conductively coupled to and magnetically isolated from said transformer secondary winding, said ferroresonant load coil being responsive to and providing regulation of the transformer secondary winding alternating polarity voltage for developing a regulated B+ scan supply voltage.

4. A television system according to claim 3 including a high voltage winding closely coupled magnetically with said transformer secondary winding voltage and a high voltage circuit coupled to said high voltage winding for developing a picture tube ultor voltage.

5. A television system according to claims 1, 3 or 4 including a capacitance coupled to said ferroresonant load coil in such a manner as to generate a circulating current that magnetically saturates the core portion associated with said coil during each cycle of said load coil alternating voltage to regulate the voltage developed across said secondary winding without generating said circulating current in the secondary winding.

6. A television system according to claim 5 wherein the transformer core portion associated with said transformer secondary winding remains substantially unsaturated magnetically during the entire cycle of the transformer secondary winding alternating voltage.

7. A television system according to claim 6 wherein said transformer primary and secondary windings are loosely coupled magnetically to enable the secondary winding voltage to be substantially unchanged in amplitude with primary winding voltage variations.

8. A television receiver including a ferroresonant regulated power supply, comprising:
    a source of alternating input voltage;
    a transformer including first and second windings, said first winding being coupled to said source for developing an alternating polarity voltage across said second winding, said alternating polarity voltage having a tendency to undesirably vary with variations of said alternating input voltage;
    a saturable reactor including a magnetizable core and a reactor winding wound on said core, said reactor winding and said transformer second winding being conductively coupled to develop an alternating polarity voltage across said reactor winding, said transformer second winding being magnetically isolated from said saturable reactor such that the magnetic flux flowing in said reactor core does not link said transformer second winding;

a capacitance coupled to a winding of said saturable reactor for developing a circulating current that aids in magnetically saturating a portion of said reactor core associated with the reactor winding that is conductively coupled to the transformer second winding for reducing by means of ferroresonant regulation the voltage variations across the conductively coupled saturable reactor winding with variations in input voltage in order to regulate the voltage across said transformer second winding against the above tendency to vary with variations of input voltage;

a high voltage winding of said transformer responsive to the regulated voltage developed across said transformer second winding for stepping up the voltage developed across said second winding;

an ultor terminal; and a high voltage rectifier arrangement coupled to said transformer high voltage winding and to said ultor terminal for developing a regulated DC ultor voltage from the stepped up voltage.

9. A televsion receiver including a regulated power supply according to claim 8 wherein said transformer includes a fourth winding responsive to the regulated voltage developed across said transformer second winding for developing a regulated voltage across said fourth winding; and wherein said television receiver includes a deflection winding, means responsive to said transformer fourth winding regulated voltage for developing a B+ scan supply voltage, and a deflection generator responsive yto said B+ scan supply voltage for generating scanning current in said deflection winding.

10. A television receiver including a regulated power supply according to claims 8 or 9 wherein said second winding is wound on a magnetizable core of said transformer, the portion of said transformer magnetizable core associated with said second winding remaining substantially unsaturated magnetically during the entire cycle of said transformer second winding alernating polarity voltage.

11. A television receiver including a regulated power supply according to claim 10 wherein said transformer is designed with loose magnetic coupling between said first and second windings so as to create an equivalent impedance in series with said source of input voltage for absorbing variations in input voltage while enabling the voltage across said second winding to remain substantially constant with said variations.

12. A television receiver including a regulated power supply according to claim 8 wherein said second and high voltage windings of said transformer are concentrically wound on the magnetizable core of the transformer and wherein said capacitance is directly in-circuit with a winding of said saturable reactor for preventing the flow of circulating current into the second winding of said transformer.

* * * * *